United States Patent
Baek et al.

(10) Patent No.: US 8,993,143 B2
(45) Date of Patent: Mar. 31, 2015

(54) JELLY-ROLL OF STRUCTURE HAVING ELASTIC MEMBER ADHERED ON ACTIVE MATERIAL-NON-COATED PORTION AND SECONDARY BATTERY EMPLOYED WITH THE SAME

(75) Inventors: Se-Hoon Baek, Seoul (KR); Dongmyung Kim, Daejeon (KR); Eui Kwang Jeong, Daejeon (KR); Hyunwoo Cho, Seoul (KR); Joo-Hwan Sung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 421 days.

(21) Appl. No.: 12/669,302

(22) PCT Filed: Jul. 11, 2008

(86) PCT No.: PCT/KR2008/004074
§ 371 (c)(1),
(2), (4) Date: Jun. 22, 2010

(87) PCT Pub. No.: WO2009/011517
PCT Pub. Date: Jan. 22, 2009

(65) Prior Publication Data
US 2010/0255357 A1  Oct. 7, 2010

(30) Foreign Application Priority Data
Jul. 16, 2007 (KR) .................. 10-2007-0071363

(51) Int. Cl.
*H01M 4/00* (2006.01)
*H01M 10/0587* (2010.01)
*H01M 10/04* (2006.01)

(52) U.S. Cl.
CPC ...... *H01M 10/0587* (2013.01); *H01M 10/0431* (2013.01)
USPC ............................................................ 429/94

(58) Field of Classification Search
CPC ............ H01M 10/04; H01M 10/0587; H01M 10/0431; Y02E 60/12
USPC ............................................................ 429/94
See application file for complete search history.

(56) References Cited

U.S. PATENT DOCUMENTS 5,567,544 A * 10/1996 Lyman .......................... 429/152
6,383,687 B1 * 5/2002 Gibbons et al. ............... 429/233

(Continued)

FOREIGN PATENT DOCUMENTS

JP  2000-003722 A  1/2000
JP  2000003722 A *  1/2000

(Continued)

*Primary Examiner* — Gary Harris
(74) *Attorney, Agent, or Firm* — Birch, Stewart, Kolasch & Birch, LLP

(57) ABSTRACT

Disclosed herein are a winding type electrode assembly ('jelly-roll') constructed in a structure in which a cathode sheet and an anode sheet are wound in a circle while a separator is interposed between the cathode sheet and the anode sheet or the assembly is compressed in one direction after winding, wherein the jelly-roll includes an active material non-coated portion formed at the wound end of the jelly-roll, a conductive tape attached to the wound end of the jelly-roll for covering the wound outside of the jelly-roll including the active material non-coated portion, and an elastic member attached to the inside of the active material non-coated portion, the elastic member having a thickness equivalent to 50 to 200% of the height of an active material layer, and a secondary battery including the same.

15 Claims, 5 Drawing Sheets

(56) References Cited

U.S. PATENT DOCUMENTS

| | | | |
|---|---|---|---|
| 2003/0072993 A1* | 4/2003 | Kim et al. | 429/94 |
| 2006/0251962 A1* | 11/2006 | Kim | 429/130 |

FOREIGN PATENT DOCUMENTS

| | | | |
|---|---|---|---|
| JP | 2001-196090 A | | 7/2001 |
| JP | 2001196090 A * | | 7/2001 ............ H01M 10/28 |
| JP | 2005-63680 A | | 3/2005 |
| JP | 2005063680 A * | | 3/2005 |
| KR | 2003-0031820 A | | 4/2003 |
| KR | 2003-0053546 A | | 7/2003 |
| KR | 10-2006-0037852 A | | 5/2006 |
| KR | 10-0686813 B1 | | 11/2006 |
| KR | 10-2007-0006255 A | | 1/2007 |
| KR | 10-2007-0025682 A | | 3/2007 |

* cited by examiner

JELLY-ROLL OF STRUCTURE HAVING ELASTIC MEMBER ADHERED ON ACTIVE MATERIAL-NON-COATED PORTION AND SECONDARY BATTERY EMPLOYED WITH THE SAME

TECHNICAL FIELD

The present invention relates to a winding type electrode assembly ('jelly-roll') constructed in a structure in which a cathode sheet and an anode sheet are wound in a circle while a separator is interposed between the cathode sheet and the anode sheet or the assembly is compressed in one direction after winding, wherein the jelly-roll includes an active material non-coated portion formed at the wound end of the jelly-roll, a conductive tape attached to the wound end of the jelly-roll for covering the wound outside of the jelly-roll including the active material non-coated portion, and an elastic member, having a predetermined thickness, attached to the inside of the active material non-coated portion.

BACKGROUND ART

As mobile devices have been increasingly developed, and the demand of such mobile devices has increased, the demand of secondary batteries has also sharply increased as an energy source for the mobile devices. Among them is a lithium secondary battery having high energy density and high discharge voltage, on which much research has been carried out and which is now commercially and widely used.

Depending upon the shape of a battery case, a secondary battery may be classified as a cylindrical battery having a jelly-roll mounted in a cylindrical metal container, a prismatic battery having a jelly-roll mounted in a prismatic metal container, or a pouch-shaped battery having a jelly-roll mounted in pouch-shaped case made of an aluminum laminate sheet.

Also, an electrode assembly mounted in the battery case is a power generating element, having a cathode/separator/anode stacking structure, which can be charged and discharged. The electrode assembly may be classified as a folding type electrode assembly (jelly-roll) constructed in a structure in which a long-sheet type cathode and a long-sheet type anode, to which active materials are applied, are wound while a separator is disposed between the cathode and the anode or a stacking type electrode assembly constructed in a structure in which pluralities of cathodes and anodes having a predetermined size are consecutively stacked while separators are disposed respectively between the cathodes and the anodes. The jelly-roll is preferred because the jelly-roll is easy to manufacture and has high energy density per weight.

The structure of a conventional representative cylindrical lithium secondary battery is typically illustrated in FIG. 1.

Referring to FIG. 1, a secondary battery 10 includes a cylindrical container 20, an electrode assembly 30 mounted in the container 20, and a cap assembly 40 coupled to the top of the container 20.

The electrode assembly 30 is constructed in a structure in which a cathode 31 and an anode 32 are wound in a jelly-roll shape while a separator 33 is interposed between the cathode 31 and the anode 32. To the cathode 31 is attached a cathode lead 34, which is connected to the cap assembly 40. To the anode 32 is attached an anode lead (not shown), which is connected to the bottom of the container 20.

The cap assembly 40 includes a top cap 41 constituting a cathode terminal, a positive temperature coefficient (PTC) element 42 for interrupting electric current through the great increase of battery resistance when the interior temperature of the battery increases, a bent safety member 43 for interrupting electric current or discharging gas when the interior pressure of the battery increases, a gasket 44 for electrically isolating the bent safety member 43, excluding a specific portion of the bent safety member 43, from a cap plate 45, and the cap plate 45 connected to the cathode lead 34, which is attached to the cathode 31. The cap assembly 40 is constructed in a structure in which the top cap 41, the PTC element 42, the bent safety member 43, the gasket 44, and the cap plate 45 are consecutively stacked.

Meanwhile, the jelly-roll type electrode assembly is constructed in a structure in which the anode is wound to constitute the outermost electrode layer, and a sealing tape for preventing the anode from unwinding is attached to the outside of the anode. In this state, the jelly-roll type electrode assembly is mounted in the metal container.

Generally, when the jelly-roll type electrode assembly is mounted in the metal container to constitute a battery, the anode lead is welded to an anode current collector of the electrode assembly, and the anode lead is also welded to the metal container. In this case, however, several problems occur. First, the electrode lead is added between a cathode current collector and the anode current collector, which consecutively form uniform contact interfaces. As a result, at least a portion of the anode current collector where the electrode lead is attached is bent. The portion of the anode current collector may be deformed as the jelly-roll repeatedly expands and contracts due to the continuous charge and discharge of the battery (J/R twist). Second, a space for the electrode lead is needed between the electrode assembly and the metal container, with the result that the size of the battery increases as compared with other batteries having the same capacity.

In order to solve the above-mentioned problems, Japanese Patent Application Publication No. 2001-196090 discloses a technology for achieving the direct connection with the metal container using a conductive tape as the sealing tape of the jelly-roll type electrode assembly. However, this technology has a disadvantage in that the conductive tape is separated from the container at the portion where the conductive tape and the container is in contact with each other, as the jelly-roll repeatedly expands and contracts due to the continuous charge and discharge of the battery, whereby a short circuit may occur. In order to solve the above-mentioned problem, the jelly-roll type electrode assembly may be constructed with a size almost corresponding to the inner diameter of the container. In this case, however, there is a great possibility that the outer separator and electrode will be damaged when the jelly-roll type electrode assembly is inserted into the metal container.

Therefore, there is a high necessity for a technology that is capable of preventing the jelly-roll from unwinding, during the assembly of the secondary battery including the jelly-roll type electrode assembly, and maintaining the stable connection between the conductive tape and the metal container when the jelly-roll repeatedly expands and contracts due to the continuous charge and discharge of the battery.

DISCLOSURE OF INVENTION

Technical Problem

Therefore, the present invention has been made to solve the above problems, and other technical problems that have yet to be resolved.

As a result of a variety of extensive and intensive studies and experiments to solve the problems as described above, the inventors of the present invention have found that, when an elastic member is attached to the inside of an active material non-coated portion, as will be described in the following, in a structure in which a conductive tape is used as a sealing tape for unwinding prevention, the electrical connection with a metal container is stably maintained in spite of expansion and contraction of a battery due to the repetitive charge and discharge of the battery. The present invention has been completed based on these findings.

Technical Solution

In accordance with one aspect of the present invention, the above and other objects can be accomplished by the provision of a winding type electrode assembly ('jelly-roll') constructed in a structure in which a cathode sheet and an anode sheet are wound in a circle while a separator is interposed between the cathode sheet and the anode sheet or the assembly is compressed in one direction after winding, wherein the jelly-roll includes an active material non-coated portion formed at the wound outer end of the jelly-roll, a conductive tape attached to the wound outer end of the jelly-roll for covering the wound outside of the jelly-roll including the active material non-coated portion, and an elastic member attached to the inside of the active material non-coated portion, the elastic member having a thickness equivalent to 50 to 200% of the height of an active material layer.

In the jelly-roll according to the present invention, the active material non-coated portion is a portion where no active material is applied to the wound outer end of the jelly-roll constructed by winding the cathode sheet and the anode sheet while the separator is interposed between the cathode sheet and the anode sheet. Specifically, the active material non-coated portion is a portion where no active material is applied to the wound outer end of the wound cathode sheet or the wound anode sheet. The conductive tape is attached to the corresponding outside of the jelly-roll while covering the outside of the active material non-coated portion formed at the wound end of the jelly-roll.

That is, the conductive tape is disposed along the outer circumference of the jelly-roll, such that one end of the conductive tape is attached to the active material non-coated portion of one electrode sheet and the other end of the conductive tape is attached to the outside of the jelly-roll, for preventing the jelly-roll from unwinding. Also, the electrical connection between the electrode sheet and the battery case is achieved by the conductive tape.

The adhesive force provided by the conductive tape when the conductive tape is attached to the outside of the electrode sheet while the opposite ends of the conductive tape overlap each other is greater than the adhesive force provided by the conductive tape when the conductive tape is simply attached to the outside of the electrode sheet, whereby excellent unwinding prevention characteristics are exhibited by the difference of the adhesive force.

Furthermore, the elastic member, having a predetermined thickness, is attached to the inside of the active material non-coated portion, such that the active material non-coated portion is pushed by the elastic member from the center of the electrode assembly toward the battery case (for example, metal container), whereby it is possible to prevent the conductive tape from being separated from the inside of the battery case due to the change in volume of the jelly-roll during the charge and discharge of the battery cell.

The outermost electrode sheet, to which the conductive tape is attached, may be a cathode or an anode. Generally, a cylindrical battery is constructed in a structure in which the anode is located at the outermost side of the jelly-roll, and a prismatic battery is constructed in a structure in which the cathode is located at the outermost side of the jelly-roll. Depending upon the construction of the outermost electrode, the kind of the electrode sheet, to which the conductive tape is attached, may be changed.

Since, the elastic member is attached to the inside of the active material non-coated portion, the elastic member may have a thickness equivalent to 50 to 200%, preferably 90 to 130%, of the height of the active material layer in order to prevent the increase of the thickness of the jelly-roll due to such a structure. If the thickness of the elastic member is less than 50% of the height of the active material layer, it is difficult to secure a desired elastic force when the jelly-roll expands and contracts. On the other hand, if the thickness of the elastic member is greater than 200% of the height of the active material layer, the thickness of the jelly-roll increases to that extent, with the result that, when the jelly-roll is inserted into the battery case, the jelly-roll may be damaged. However, even when the elastic member is thicker than the active material layer, the jelly-roll may be inserted into the battery case, while the elastic member is compressed to the height of the active material layer, during the manufacturing process of the battery, by virtue of the elastic force of the elastic member.

The coupling between the elastic member and the active material non-coated portion may be achieved by applying an adhesive to the end of one side of the elastic member and attaching the end of one side of the elastic member to the corresponding end of the active material non-coated portion by adhesion. Alternatively, the adhesive may be applied to a region of the active material non-coated portion where the active material non-coated portion is coupled to the elastic member.

As the adhesive applied to the end of one side of the elastic member, various materials may be used which do not affect the operation of the battery and provide an adhesive force enough to maintain the wound state of the jelly-roll. For example, an acryl adhesive or an SBR adhesive may be used.

During the charge and discharge of the secondary battery, the electrode assembly repeatedly expands and contracts. In consideration of the deformation degree of the electrode assembly, the height of the elastic member preferably has a size equivalent to 70 to 100% of the width of the jelly-roll. In this case, the shape of the elastic member is not particularly restricted. For example, the elastic member may be formed in the shape of an elongated rectangle.

The material for the elastic member is not particularly restricted so long as the elastic member exhibits an elastic force. For example, the elastic member may be made of a material having high elasticity and no hygroscopicity, such as rubber.

According to circumstances, the elastic material may be a porous material. Alternatively, the elastic material may be at least one insulative material selected from a group consisting of sponge and styrene foam.

Generally, the porous material may be classified as an open cell type material or a closed cell type material. The sponge is the open cell type material, whereas the styrene foam is the closed cell type material. It is preferred to use the closed cell type porous material, which exhibits excellent durability.

The jelly-roll is manufactured by coating a metal foil, which will be used as a current collector, with an electrode active material, drying and pressing the metal foil, cutting the metal foil into a band shape having a predetermined width and length, partitioning an anode and a cathode using a separator, winding the anode and the cathode, while the separator is disposed between the anode and the cathode, in a spiral shape. Consequently, the jelly-roll has a circular cross section. Depending upon a case to be used, the shape of the jelly-roll may be changed. When the jelly-roll is to be inserted into a prismatic battery case, pressure is applied to the jelly-roll in the side direction such that the jelly-roll has an elliptical cross section. Consequently, the jelly-roll preferably has a circular or elliptical cross section.

The conductive tape is attached to the wound outer end of the electrode sheet, i.e., the active material non-coated portion, to complete the winding of the jelly-roll. Preferably, the conductive tape includes a thin metal foil base and a conductive adhesive layer applied to the thin metal foil base, and the conductive adhesive layer includes an adhesive and conductive metal powder. For example, the metal foil base may be made of copper having high conductivity, and the conductive metal powder may be nickel, aluminum, or copper powder.

The manufacture of the secondary battery is completed by inserting the jelly-roll into the container, while the winding of the jelly-roll is completed using the conductive tape, as described above. When the secondary battery is charged and discharged, electric current flows to the conductive metal powder in contact with the active material non-coated portion of the electrode sheet. The electric current flows to the container via the metal foil, with the result that the container exhibits the property of an anode.

According to circumstances, the opposite ends of the conductive tape preferably overlap each other by 5 to 15% of the outer circumferential length of the jelly-roll. If the overlapping length of the coupled ends of the conductive tape is too small, the opposite ends of the conductive tape may be easily separated from each other, due to the increase of the internal stress to a restoring force of the jelly-roll caused by repetitive expansion and contraction of the jelly-roll during the repetitive charge and discharge of the battery, with the result that the jelly-roll may unwind. On the other hand, the overlapping length of the coupled ends of the conductive tape is too large, the thickness of the jelly-roll increases to the extent corresponding to the overlapping portion, with the result that the total capacity of the battery decreases.

In accordance with another aspect of the present invention, there is provided a secondary battery constructed in a structure in which the above-described jelly-roll is mounted in a battery case.

The battery case may be, for example, a prismatic or cylindrical metal container. A cylindrical secondary battery may be manufactured by inserting a jelly-roll, constructed in a structure in which a cathode sheet and an anode sheet is wound, which a separator is interposed between the cathode sheet and the anode sheet, in the shape of a circle, and a conductive tape is attached to the jelly-roll such that the outside of the jelly-roll is covered by the conductive tape, into a cylindrical container, impregnating the jelly-roll with an electrolyte, and sealing the cylindrical container.

A prismatic secondary battery may be manufactured in the same manner as the above cylindrical secondary battery except that the jelly roll wound in the shape of a circle is compressed flat and is then inserted into a prismatic container, and therefore, a detailed description thereof will not be given.

BRIEF DESCRIPTION OF THE DRAWINGS

The above and other objects, features and other advantages of the present invention will be more clearly understood from the following detailed description taken in conjunction with the accompanying drawings, in which.

MODE FOR THE INVENTION

Now, a preferred embodiment of the present invention will be described in detail with reference to the accompanying drawings. It should be noted, however, that the scope of the present invention is not limited by the illustrated embodiment.

Figure 1:
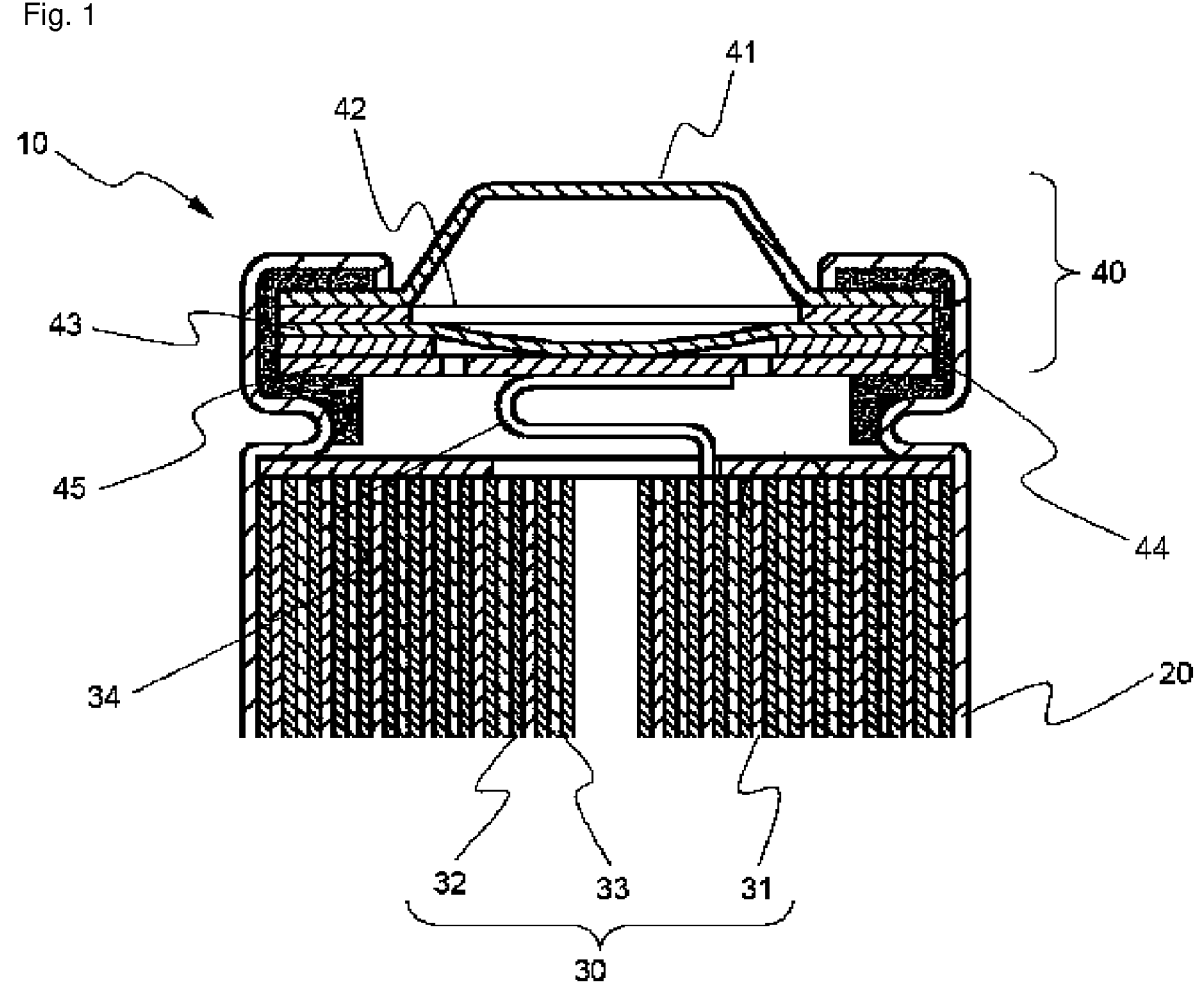
FIG. 1 is a typical view illustrating the structure of a conventional cylindrical lithium secondary battery.
Figure 2:
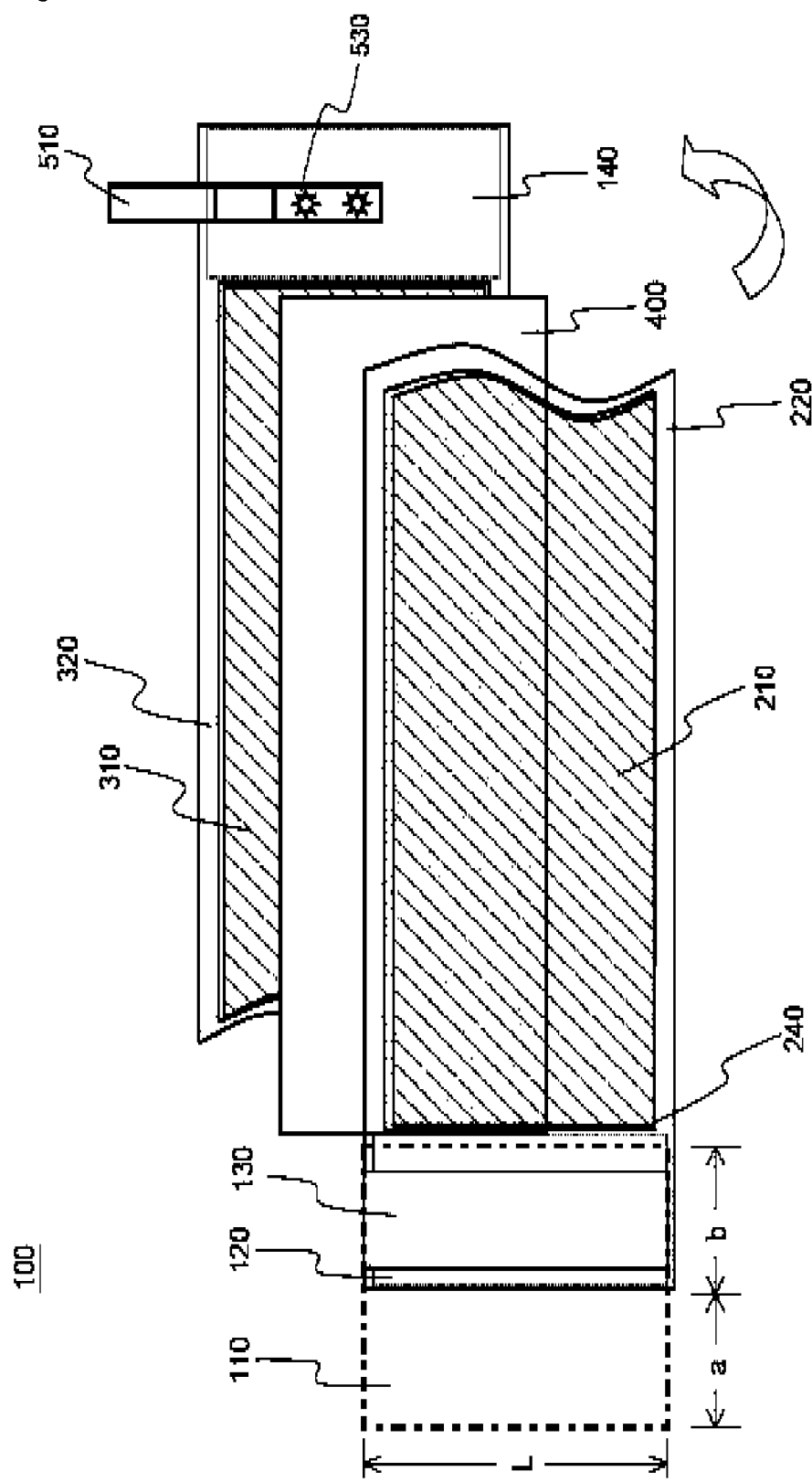
FIG. 2 is a typical view illustrating a jelly-roll type electrode assembly used in a secondary battery according to a preferred embodiment of the present invention.

FIG. 2 is a typical view illustrating the structure a jelly-roll type electrode assembly used in a secondary battery according to a preferred embodiment of the present invention before winding.

Referring to FIG. 2, a jelly-roll type electrode assembly 100 is manufactured by winding a cathode sheet having a cathode plate 320, to opposite sides of which a cathode active material 310 is applied, and an anode sheet having an anode plate 220, to opposite sides of which an anode active material 210 is applied, while interposing a separator between the cathode sheet and the anode sheet, in the direction indicated by the arrow. At the end of one side of the cathode plate 320 is formed an active material non-coated portion 140. The upper end of a cathode terminal 510 protrudes out of the active material non-coated portion 140, and the lower end of the cathode terminal 510 is welded to the active material non-coated portion 140.

On the other hand, an active material non-coated portion 120 is formed at the end of one side of the anode plate 220. A conductive tape 110 covers the active material non-coated portion 120 at the outside of the active material non-coated portion 120. The conductive tape 110 has a length greater, by length a, than the length b of the active material non-coated portion 120. The conductive tape 110 is attached to the active material non-coated portion 120 by a conductive adhesive. Consequently, the electrical connection between the conductive tape and a container is achieved without welding an additional anode terminal to the active material non-coated portion 120, unlike the cathode sheet.

An elastic member 130 is attached between the inside of the active material non-coated portion 120 and the separator 400 for further securing the coupling between the conductive tape 110 and the container. The elastic member 130 has the same height as the width L of the jelly-roll. The elastic member 130 is made of an elastic material.

Figure 3:
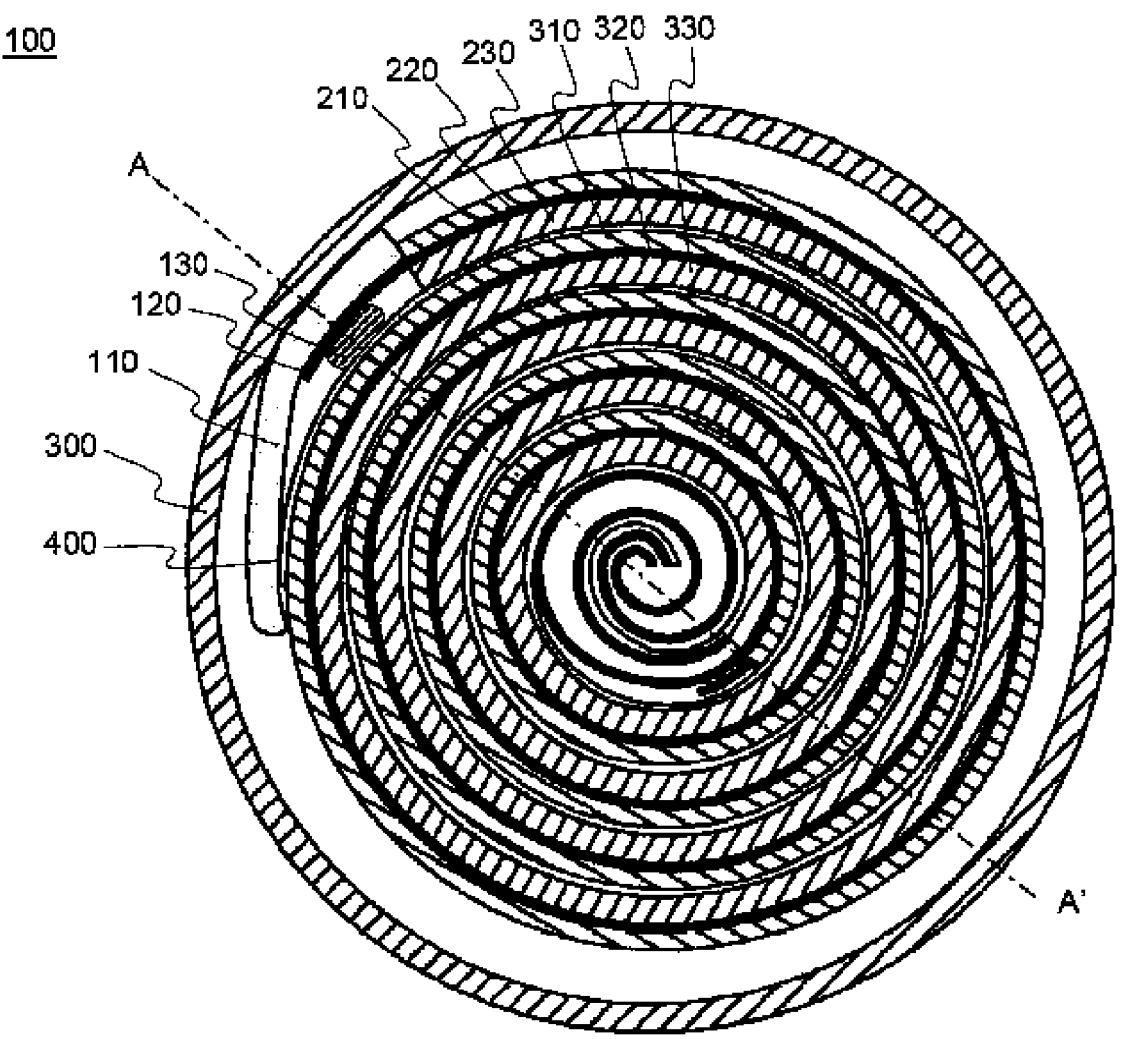
FIG. 3 is a cross sectional view of the jelly-roll type electrode assembly completed from FIG. 2.

FIG. 3 is a cross sectional view typically illustrating the jelly-roll type electrode assembly completed from FIG. 2.

Referring to FIG. 3, the jelly-roll type electrode assembly has a circular cross section. The elastic member 130 has a thickness approximately equal to or greater than the height of an anode active material layer 230. The elastic member 130 is attached to the inside of the active material non-coated portion 120. The conductive tape 110 is attached to the inside of the container 300 while covering the wound outside of the jelly-roll, including the active material non-coated portion 120.

Consequently, the conductive tape 110 prevents the wound end of the jelly-roll from unwinding during the assembly of the battery and/or during the charge and discharge of the battery. Furthermore, the conductive tape 110 eliminates a necessity to weld a conventional anode terminal to the outside of the active material non-coated portion 120 and couple the anode terminal to the inside of the container 300.

Also, the elastic member 130 is attached to the inside of the active material non-coated portion 120 by an acryl adhesive for further securing the electrical connection between the conductive tape 110 and the container 300.

Figure 4:
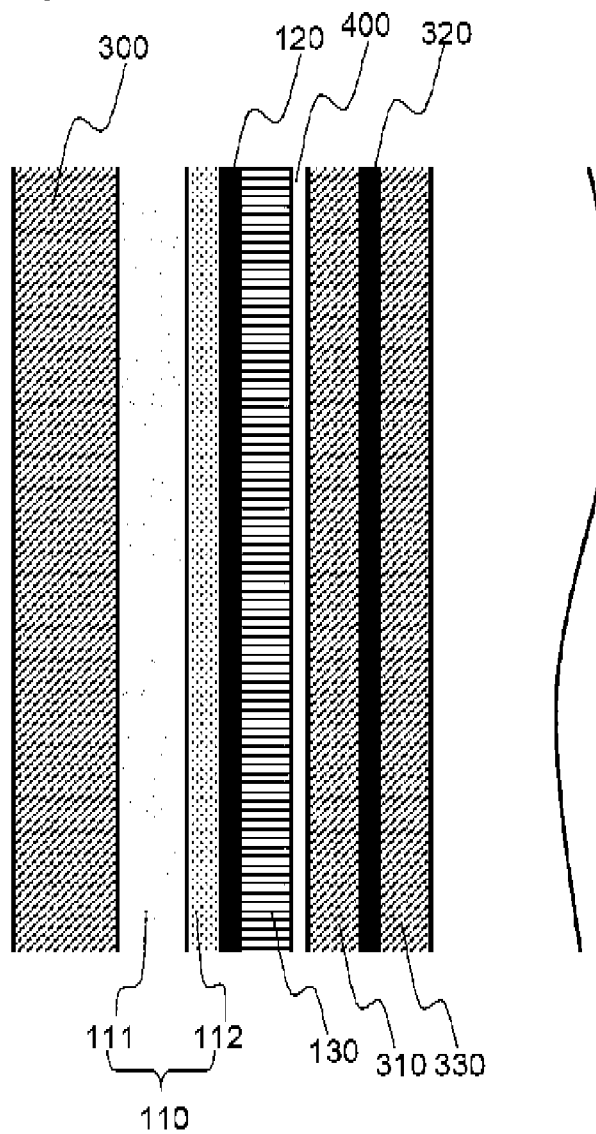
FIG. 4 is a vertical sectional view, in part, taken along line A-A' of FIG. 3.
Figure 5:
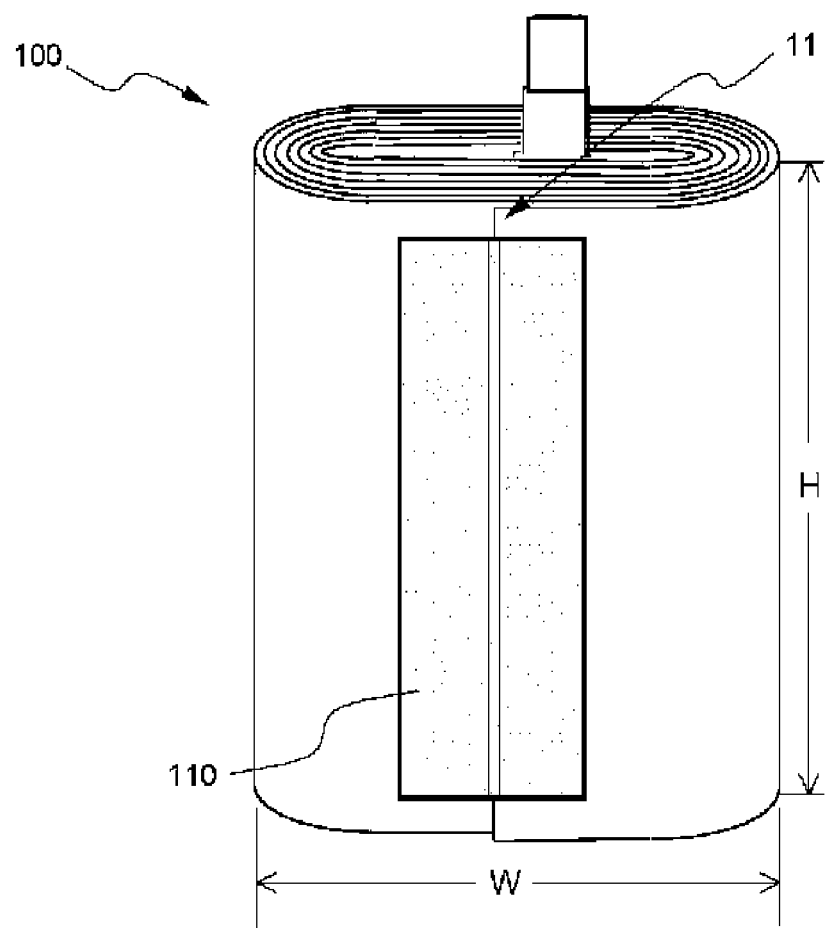
FIG. 5 is a typical view illustrating a conductive tape attached to the outside of the jelly-roll type electrode assembly.

FIG. 4 is a vertical sectional view, in part, taken along line A-A' of FIG. 3, and FIG. 5 is a typical view illustrating the conductive tape attached to the outside of the jelly-roll type electrode assembly.

Referring to these drawings, the conductive tape 110 includes a thin metal foil base 111 and an adhesive layer 112, containing conductive metal powder, applied to the thin metal foil base 111. The conductive tape 110 is attached to the wound end of the jelly-roll type electrode assembly 100 for preventing the jelly-roll type electrode assembly 100 from unwinding and thus maintaining the wound state of the jelly-roll type electrode assembly 100. The conductive tape 110, attached to the jelly-roll type electrode assembly for preventing the jelly-roll type electrode assembly from unwinding, has a size large enough to at least cover the wound end of the jelly-roll type electrode assembly 100. That is, the conductive tape 110, having a size less than the height H and the width W of the jelly-roll type electrode assembly 100, is attached to the wound end 11 of the jelly-roll type electrode assembly 100.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the conductive tape is attached to the jelly-roll according to the present invention while completely covering the outside of the active material non-coated portion, and, at the same time, the elastic member, having a predetermined thickness, is attached to the inside of the active material non-coated portion. Consequently, it is not necessary to weld the electrode terminal to the active material non-coated portion, and it is possible to maintain the stable connection between the conductive tape and the battery case even when the jelly-roll repeatedly expands and contracts due to the continuous charge and discharge of the battery.

The invention claimed is:

1. A winding type electrode assembly ('jelly-roll') constructed in a structure in which a cathode sheet and an anode sheet are wound in a circle while a separator is interposed between the cathode sheet and the anode sheet or the assembly is compressed in one direction after winding, comprising: a cathode sheet having a cathode active material on opposite sides of the cathode sheet; an anode sheet having an anode active material on opposite sides of the anode sheet; an active material non-coated portion formed at the end of the cathode sheet or the anode sheet; an elastic member attached to an inner surface of the active material non-coated portion; and a conductive tape attached to the end of the cathode sheet or the anode sheet for covering the wound outside of the jelly-roll, the conductive tape attached to an outer surface of the non-coated portion.

2. The jelly-roll according to claim 1, wherein the elastic member has a thickness equivalent to 90 to 130% of the height of the active material layer.

3. The jelly-roll according to claim 1, wherein an end of the elastic member is coupled to the non-coated portion by an adhesive.

4. The jelly-roll according to claim 3, wherein the adhesive is an acryl adhesive or an SBR adhesive.

5. The jelly-roll according to claim 1, wherein the elastic member has a height equivalent to 70 to 100% of the width of the jelly-roll.

6. The jelly-roll according to claim 1, wherein the elastic member is made of an elastic material.

7. The jelly-roll according to claim 6, wherein the elastic material is rubber or a porous material.

8. The jelly-roll according to claim 7, wherein the porous material is an insulative material selected from a group consisting of sponge and styrene foam.

9. The jelly-roll according to claim 1, wherein the jelly-roll has a circular or elliptical cross section.

10. The jelly-roll according to claim 1, wherein the conductive tape includes a thin metal foil base and an adhesive layer, containing conductive metal powder, applied to the thin metal foil base, the conductive tape being attached to a wound end of the jelly-roll.

11. The jelly-roll according to claim 1, wherein opposite ends of the conductive tape overlap each other by 5 to 15% of an outer circumferential length of the jelly-roll.

12. A secondary battery constructed in a structure in which a jelly-roll according to claim 1 is mounted in a battery case.

13. The secondary battery according to claim 12, wherein the battery case is a cylindrical or prismatic metal container.

14. The jelly-roll according to claim 1, wherein the elastic member has a thickness equivalent to 50 to 200% of the height of an active material layer.

15. The jelly-roll according to claim 1, further comprising a container housing the cathode sheet and the anode sheet, and
    wherein the elastic member pushes the conductive tape into contact with the container.

* * * * *